United States Patent
Petruchik et al.

(12) 
(10) Patent No.: US 6,394,870 B1
(45) Date of Patent: *May 28, 2002

(54) FORMING A DISPLAY HAVING CONDUCTIVE IMAGE AREAS OVER A LIGHT MODULATING LAYER

(75) Inventors: Dwight J. Petruchik, Honeoye Falls; Stanley W. Stephenson, Spencerport, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/379,776

(22) Filed: Aug. 24, 1999

(51) Int. Cl.$^7$ .............................. H01J 9/00; H01J 9/24; G02F 1/1343; G02F 1/13

(52) U.S. Cl. .......................... 445/24; 445/23; 349/142; 349/187

(58) Field of Search .................. 445/24; 349/142, 349/187, 106, 139; 313/506, 495–97; 428/917

(56) References Cited

U.S. PATENT DOCUMENTS

| | | | |
|---|---|---|---|
| 3,617,374 A | * 11/1971 | Hodson et al. | 117/212 |
| 4,435,047 A | 3/1984 | Fergason | |
| 5,437,811 A | 8/1995 | Doane et al. | |
| 5,695,682 A | 12/1997 | Doane et al. | |
| 5,808,412 A | * 9/1998 | Zovko et al. | 313/506 X |
| 6,013,982 A | * 1/2000 | Thompson et al. | 313/506 |
| 6,236,442 B1 | * 5/2001 | Stephenson et al. | 349/142 |
| 6,259,198 B1 | * 7/2001 | Yanagisawa et al. | 313/495 |

FOREIGN PATENT DOCUMENTS

WO  WO 97/04398  2/1997

* cited by examiner

Primary Examiner—Kenneth J. Ramsey
Assistant Examiner—Mack Haynes
(74) Attorney, Agent, or Firm—Raymond L. Owens (57) ABSTRACT

A display in which images can be selectively presented to a viewer, is formed by providing a transparent substrate; forming a transparent, electrically conductive coating over the transparent substrate; forming a light modulating layer including liquid crystal material in a polymer binder over the transparent, electrically conductive layer; forming by directly depositing conductive material in an image wise pattern over the light modulating layer to provide viewable and conductive images, the light modulating layer being effective in a first condition to prevent the viewing of the viewable and conductive images and in a second condition to permit the viewing of the viewable and conductive images. Electrical connection is made so that an electrical field can be applied across selected ones of such viewable and conductive images and the transparent, electrically conductive layer to cause the light modulating layer underlying the selected ones of the viewable and conductive images to change from the first condition to the second condition so as to present such viewable and conductive images for viewing to the viewer.

6 Claims, 7 Drawing Sheets

FORMING A DISPLAY HAVING CONDUCTIVE IMAGE AREAS OVER A LIGHT MODULATING LAYER

CROSS REFERENCE TO RELATED APPLICATIONS

Reference is made to commonly-assigned U.S. patent application Ser. No. 09/105,507 filed Jan. 26, 1998 now U.S. Pat. No. 6,010,839 and commonly-assigned U.S. patent application Ser. No. 09/146,656 filed Sep. 3, 1998, now U.S. Pat. No. 6,236,442, the disclosures of which are incorporated herein by reference.

FIELD OF THE INVENTION

The field of invention pertains to image displays that can selectively transmit or reflect actinic light.

BACKGROUND OF THE INVENTION

Currently, images can be displayed on sheets of paper carrying permanent inks or displayed on electronically modulated surfaces such as cathode ray displays or liquid crystal displays. Sheet materials can carry magnetically written areas carrying ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple electronically written display sheets into a "book", each sheet provided with means to individually address each page. The patent recites prior art in forming thin, electronically written pages, including flexible sheets, image modulating material formed from a bi-stable liquid crystal system, and thin metallic conductor lines on each page. The device described requires ". . . transparent conducting polymers . . ." formed over the light modulating material. Formation of transparent conductors of the required conductivity require complex vacuum sputtering and photo-lithographic processes.

Fabrication of flexible, electronically written display sheets is disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is pressed onto the liquid crystal material. Electrical potential applied to opposing conductive areas operates on the liquid crystal material to expose display areas. The display ceases to present an image when de-energized. The Taliq Company supplied products formed using the two sheet method. Offsetting the two sheets permitted connection to conductive traces on the two sheets.

The prior art typically requires multiple, separate layers to build up the display. The electrical traces and transparent conductive layers are typically formed through repeated vacuum deposition and photolithography of materials on the substrate. These processes are expensive and require long processing times on capital intensive equipment.

The prior art discloses isolating each conductor on separate sides of the display, and connecting the traces to drive electronics using solder connections, wire bonds or pressure contact. Such connections do require that both sets of traces be exposed on a surface for the connection process. The uniform, multi-layer structure prevents connection to the inner conductive layer.

SUMMARY OF THE INVENTION

Accordingly, it is an object of the present invention to provide a display which has opaque conductive images formed in an effective manner with a minimum number of steps.

This object can be achieved by a method of forming a display in which images can be selectively presented to a viewer, comprising the steps of:
(a) providing a transparent substrate;
(b) forming a transparent, electrically conductive coating over the transparent substrate;
(c) forming a light modulating layer including liquid crystal material in a polymer binder over the transparent, electrically conductive layer;
(d) forming by directly depositing opaque conductive material in an image wise pattern over the light modulating layer in the form of viewable and conductive images, the light modulating layer being effective in a first condition to prevent the viewing of the viewable and conductive images and in a second condition to permit the viewing of the viewable and conductive images; and
(e) providing electrical connections so that an electrical field can be applied across selected ones of such viewable and conductive images and the transparent, electrically conductive layer to cause the light modulating layer underlying the selected ones of the viewable and conductive images to change from the first condition to the second condition so as to present such viewable and conductive images for viewing to the viewer.

The disclosed structure has the advantage of directly forming opaque electrically conductive material in an image wise pattern thereby reducing the number of process steps that are required for transparent conductive images. The opaque, electrically conductive material can be a conductive ink deposited using screen printing. Printing processes are widely available, and simple and effective means to provide custom display. Displays in accordance with the present invention can be in the form of display sheets that can be made using conventional coating technology. A single large area of sheet material can be coated and formed into different types of displays by printing opaque, electrically conductive indicia onto the coated sheet.

DETAILED DESCRIPTION OF THE INVENTION

Figure 1A:
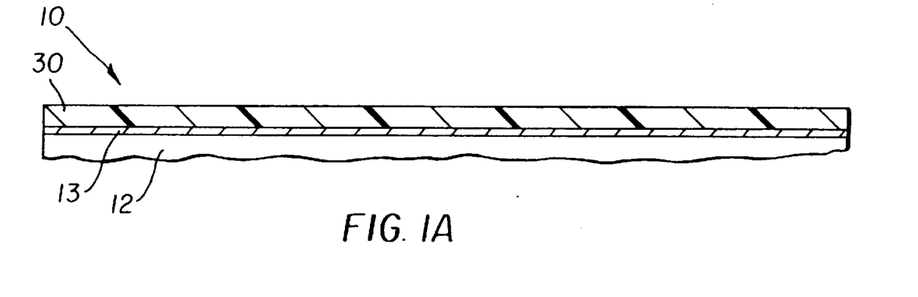
FIG. 1A is a sectional view of an unprocessed sheet used to form a display in accordance with the present invention.

A sectional view of an unprocessed sheet 10 used in the invention is shown in FIG. 1A. The sheet 10 will be processed to form a display 5 in accordance with the present invention. The sheet 10 includes a substrate 12. Substrate 12 can be made of a transparent polymeric material, such as Kodak Estar film base formed of polyester plastic, and have a thickness of between 20 and 200 microns. In an exemplary embodiment, substrate 12 can be a 80 micron thick sheet of polyester film base. Other polymers, such as transparent polycarbonate, can also be used. An optically transparent, electrically conductive layer 13 is formed over the substrate 12. The transparent, electrically conductive layer 13 can be formed of tin-oxide or Indium-Tin-Oxide (ITO), with ITO being the preferred material. Typically, the transparent, electrically conductive layer 13 is sputtered onto the substrate 12 to a resistance of less than 250 ohms per square.

A light modulating layer 30 is formed over the transparent, electrically conductive layer 13. Light modulating layer 30 can be a polymer encapsulated conventional liquid crystal dispersed in a polymeric matrix. The liquid crystal can be a chiral doped nematic liquid crystal, also known as cholesteric liquid crystal, such as those disclosed in U.S. Pat. No. 5,695,682. Application of fields of various intensity and duration can change the state of chiral doped nematic materials from a reflective to a transmissive state. These materials have the advantage of maintaining a given state indefinitely after the field is removed. Other light reflecting, electrically modulated materials can also be coated such as a micro-encapsulated electrophoretic material. The light modulating layer 30 is effective in two conditions, which will be described in more detail below.

Figure 2A:
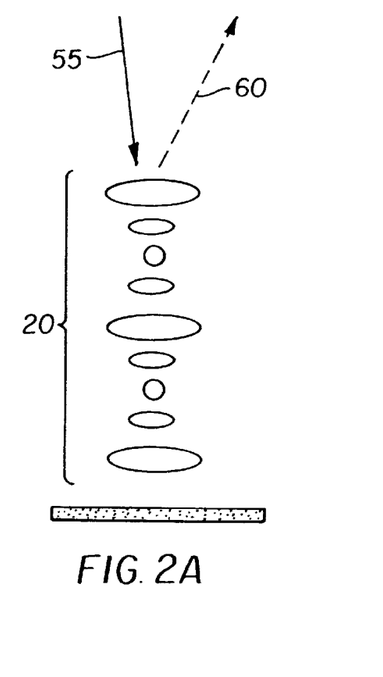
FIG. 2A is a view of the optical characteristics of a chiral nematic material in a planar state reflecting light.
Figure 2B:
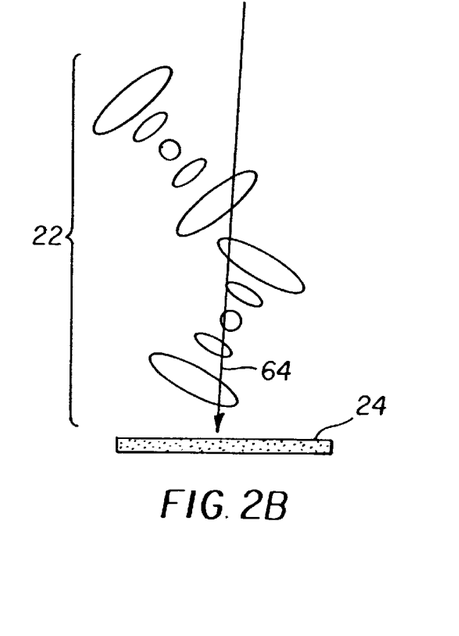
FIG. 2B is a view of the optical characteristics of a chiral nematic material in a focal-conic light transmitting state.

FIG. 2A, and FIG. 2B show states of cholesteric liquid crystals. In FIG. 2A, a high voltage field has been applied and quickly switched to zero potential, which causes the liquid crystal molecules to become planar liquid crystals 20. Incident light 55 can consist of red, green and blue fractions of white light. The pitch of the molecules can be adjusted to create a Bragg diffraction of reflected light 18 comprised of light of a given color and polarity. In this example, the chirality of planar liquid crystals 20 is adjusted to reflect green light.

In FIG. 2B, application of a lower voltage field has caused molecules of the chiral nematic material to form tilted cells that are known as the focal conic liquid crystals 22. The lower voltage field can progressively drive the molecules of the cholesteric material towards a transparent state. A light absorber 24 can be positioned on the side opposing the incident light. In the fully evolved focal-conic state light is transmitted completely an incident light 55 becomes absorbed light 64. The progressive evolution to a completely focal-conic state causes a viewer to perceive green light that transitions to black as the cholesteric material changes from a planar to a fully evolved focal-conic state. The transition to the light transmitting state is progressive, and varying the low voltage time permits a variable level of reflection. These variable levels can be mapped out to corresponding gray levels, and when the field is removed, light modulating layer 11 will maintain a given optical state indefinitely. The states are more fully discussed in U.S. Pat. No. 5,437,811.

Figure 3:
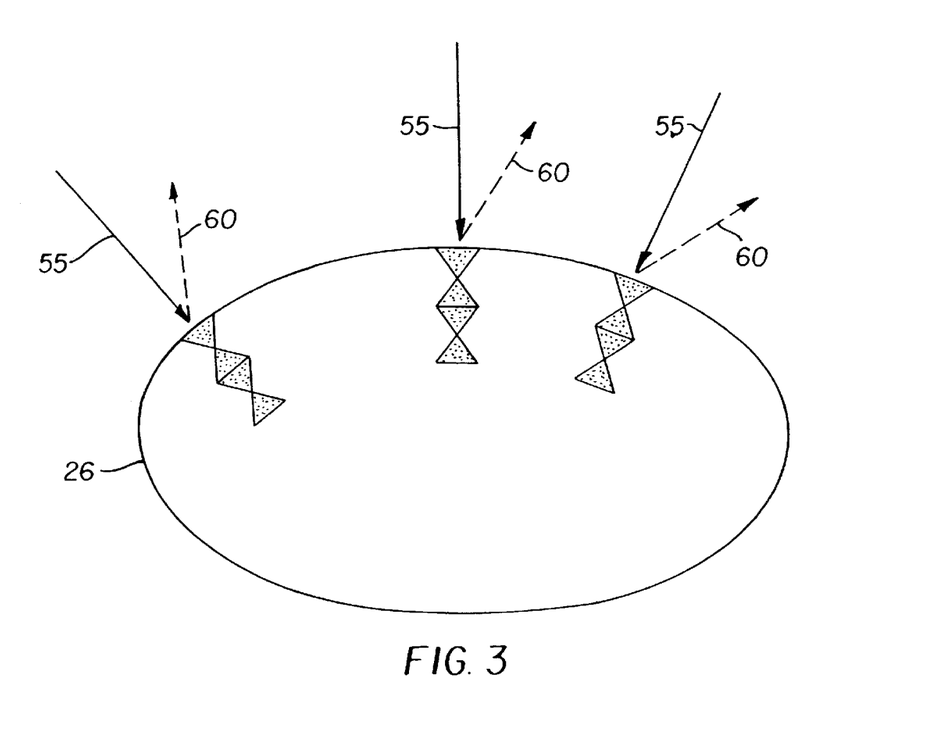
FIG. 3 is a sectional view of a domain containing chiral nematic liquid crystal material.

FIG. 3 is a cross section through a domain 26 containing a cholesteric material. Domain 26 is a spherical domain about 10 microns in diameter, and cholesteric material anchors on the surface of the domain. Because the surface of domain is spherical, incident light 55 from any angle of observation is reflected. The result is that these polymer dispersed (cholesteric) liquid crystals (PDChLC) have good off-axis reflectivity.

In an experiment, E.M Industries cholesteric material BL-118 was dispersed in deionized photographic gelatin. The liquid crystal material was dispersed at an 8% concentration in a 5% deionized gelatin solution. The mixture was homogenized to create 2–10 micron domains of the liquid crystal in aqueous suspension. The material was coated on a photographic film coating machine to provide a 9 micron thick polymerically dispersed cholesteric coating. Other organic binders such as polyvinyl alcohol (PVA) or polyethylene oxide (PEO) could have been used. Such compounds are also machine coatable on equipment associated with photographic films.

Deionized photographic gel is important in providing a binder having low ionic content. The presence of ions in such a binder hinders the development of an electrical field across the dispersed liquid crystal material. Additionally, ions in the binder can migrate in the presence of an electrical field, chemically damaging the light modulating layer 30. The liquid crystal and gelatin emulsion can be coated to a thickness of between 5 and 30 microns to optimize light modulating of light modulating layer 30. The coating thickness, size of the liquid crystal bubbles and concentration of the bubbles of liquid crystal materials is designed to maximize electrical switching of the material and optimize the optical properties of the material in both the reflective or transmissive state.

Figure 1B:
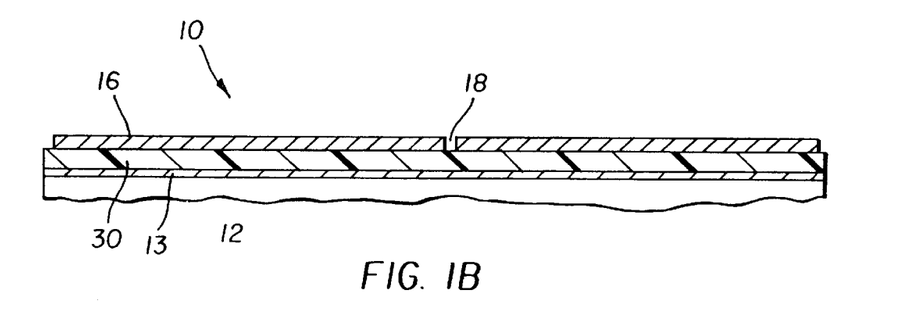
FIG. 1B is a sectional view of the sheet of FIG. 1A after directly forming opaque conductive material in an image wise pattern.

FIG. 1B is a sectional view through the sheet 10 after being directly printed with an opaque conductive ink to form conductive image areas 16. In an experiment, Electrodag 423SS screen printable opaque electrical conductive material from Acheson Corporation was screen printed to form opaque conductive areas 16. The material is finely divided graphite particles in a thermoplastic resin. The material was not heated, only air dried to form a coating between 25 and 75 microns thick. Each opaque conductive area 16 was separated from adjacent conductive areas by non-conductive areas 18. Nonconductive areas 18 are typically 50–100 microns wide. Conductive ink can be applied to non-indicia areas so that the coating covers light modulating material with the exception of fine traces that are non-conductive areas 18. The effective sheet conductivity of the opaque conductive areas 16 was less than 250 ohms per square. Opaque conductive areas 16 were opaque and highly light absorbing, typically having an optical density of greater than 2.0 D to present black images. The light absorbing property of the opaque conductive areas 16 in the experiment was adequate to serve as light absorber 24 for the cholesteric liquid crystal material. Numerous other techniques will suggest themselves to those skilled in the art. For example, in order to directly deposit conductive inks in an image-wise pattern, screen printing has been found to be highly effective. Alternatively, ink jet printing techniques can be used to form the opaque conductive images. Another technique would be to use off-set printing techniques to directly apply opaque conductive inks in a pattern on sheet 10. The direct depositing of opaque conductive materials in an image wise patterns means that a single step can be used to provide such images. An advantage of this arrangement is a reduction and simplification of process steps to form such opaque conductive images.

Experimental sheet 10 was tested by applying an alternating 90-volt field at 1 kilohertz frequency for 25 milliseconds to each opaque conductive area 16 while transparent, electrically conductive layer 13 was grounded. Light modulating material 30 over each segment was driven into a reflective state. A second alternating 40-volt field at 1 kilohertz frequency for 100 milliseconds to each opaque conductive area 16 while transparent, electrically conductive layer 13 was grounded. Light modulating material 30 over each opaque conductive area 16 became nearly transparent. The experiment proved that conductive inks could be applied to polymerically dispersed cholesteric liquid crystal material to create a display sheet 10.

Figure 1C:
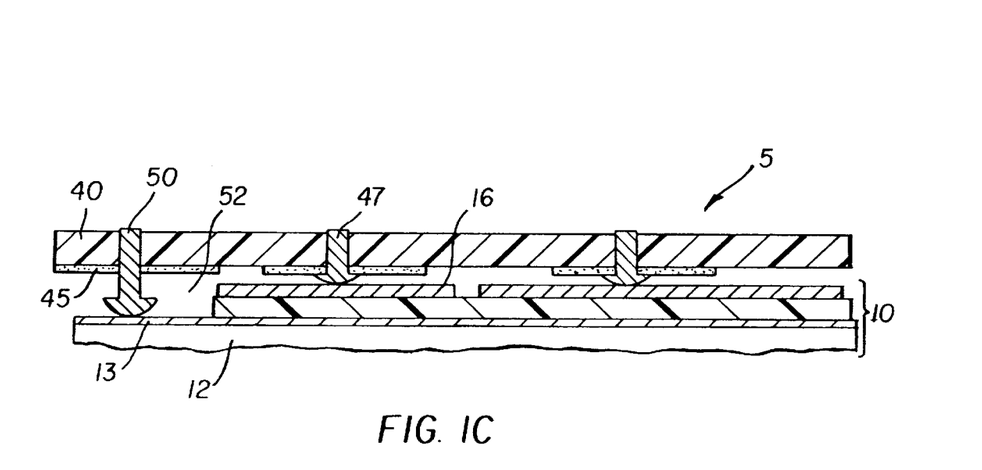
FIG. 1C is a sectional view of the sheet of FIG. 1B connected to a circuit board to form the display in accordance with the present invention.

FIG. 1C is a section view of processed sheet 10 connected to circuit board 40 to form a display 5. Circuit board 40 has a set of traces 45 that are connected to opaque conductive areas 16 through contact pads 47. Patternable conductive layer 14 can be soft, in which case, connection between circuit board 40 and opaque conductive areas 16 must be done without damage. In one case, conductive adhesive is provided between circuit board 40 and opaque conductive areas 16 to form a connection between circuit board 40 and opaque conductive areas 16.

A power pin 50 formed in the printed circuit board 40 contacts transparent, electrically conductive layer 13 through power connection area 52. It should be noted that in power connection area 52, light modulating layer 30 over power connection area 52 to facilitate direct electrical connection to the transparent, electrically conductive layer 13. Such removal can be accomplished by chemical etching. Alternatively, power pin 50 can have a sharpened point that pierces through light modulating material 30 to contact transparent, electrically conductive layer 13. Power connection area 52 can be one or more than one area that permit electrical connection to transparent, electrically conductive layer 13.

Figure 4:
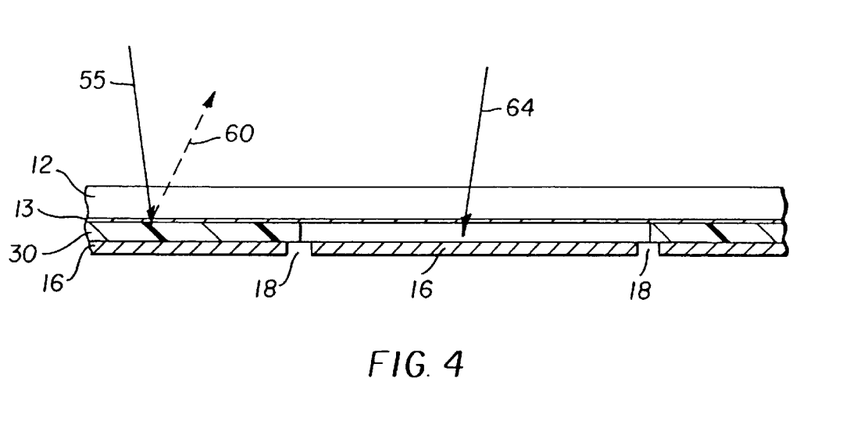
FIG. 4 is a sectional view showing light striking segments of a the display.

FIG. 4. is a drawing of the sheet 10 in both reflective and transparent states. In the central area of the drawing, light modulating material 30 has been cleared. Incident light on that area becomes absorbed light 64. On the left and right sides of sheet 10, light modulating material 30 is in a reflective state and portions of incident light 55 be come reflected light 60.

Figure 5:
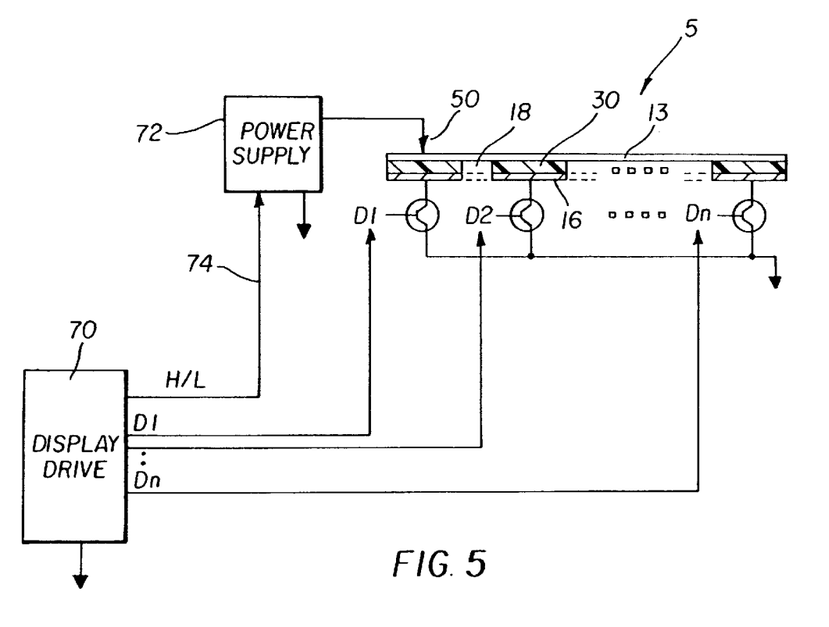
FIG. 5 is a schematic of electrical drive circuitry for the present invention.

FIG. 5 shows the external drive circuitry for changing the state of light modulating material 30. Display drive 70 is connected to a set of switching elements D1 through Dn, with one switching element per opaque conductive area 16. Power supply 72 can provide either 120 volts (high) or 40 volts (low) to display 5. The voltage is applied as a one kilohertz alternating voltage. The voltage from power supply 72 is connected to the transparent, electrically conductive layer 13 through power pin 50. Display drive 70 grounds all opaque conductive areas 16 and uses high/lower power signal 74 to apply a high, 120 volts filed across light modulating material 30 for approximately 120 milliseconds. This writes all conductive areas into the reflective state.

Display drive 70 then grounds those opaque conductive areas 16 that should be in the transparent, dark state and uses high/lower power signal 74 to apply a low, 40 volt filed across light modulating material 30 for 120 milliseconds to clear those areas that are to be dark.

Thus, the light modulating layer 30 is driven to two effective conditions. In a first condition, the light modulating layer 30 presents a dark, light absorbing state over opaque conductive areas 16, and in a second condition, the light modulating layer 30 presents a light, light reflective surface over opaque conductive areas 16.

Figure 6A:
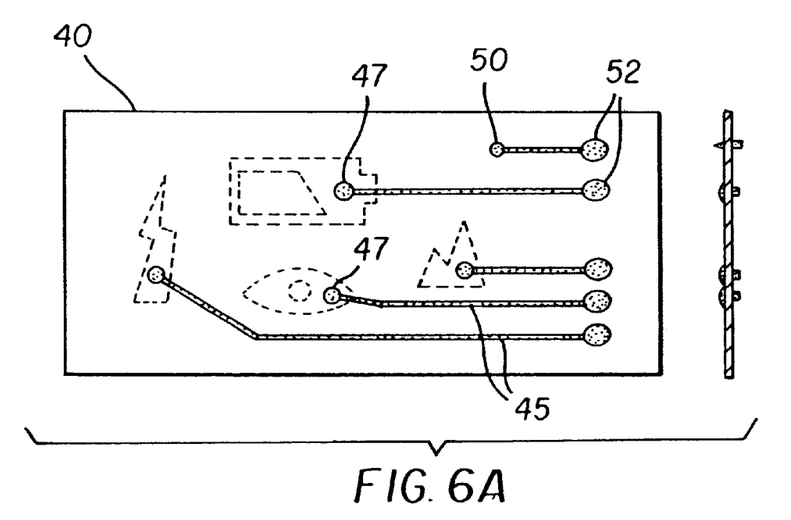
FIG. 6A is a top view of the circuit board of FIG. 1C that is part of the display.
Figure 6B:
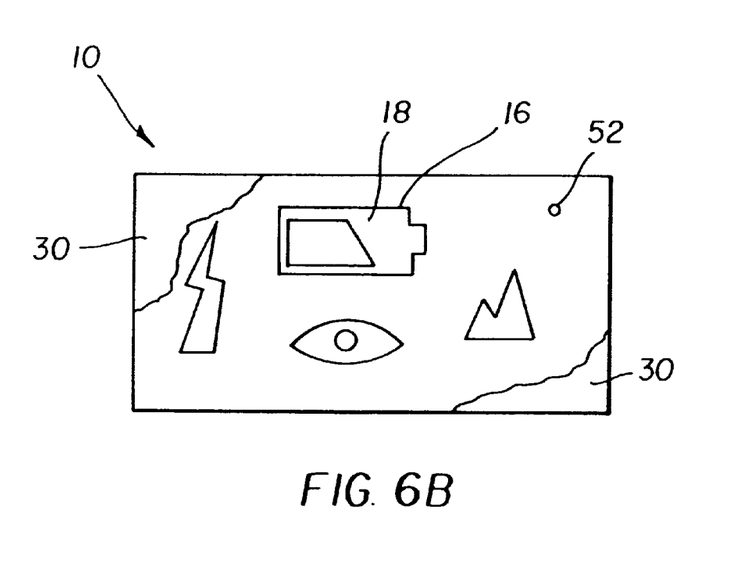
FIG. 6B is a top view with cut away sections of the processed sheet of FIG. 1B that is part of the display.

FIGS. 6A and 6B show top views of each of the two parts of display 5. FIG. 6A shows a circuit board 40, which has circuit board traces 45 running from a position under each opaque conductive area 16 to connection areas 52. Contact pads 47 are located under each opaque conductive area 16 to provide connection to each conductive trace 45 on sheet 10. FIG. 6B is a top view of sheet 10 with light modulating material 30 sectioned away to show opaque conductive areas 16. Non-conductive areas 18 serve to electrically isolate opaque conductive areas 16. Power pin 50 on circuit board 40 contacts a connection area 52 transparent, electrically conductive layer 13. Multiple power pins 50 connected to multiple connection areas 52 could be used to ensure uniform electrical field across the transparent, electrically conductive layer 13.

Figure 7A:
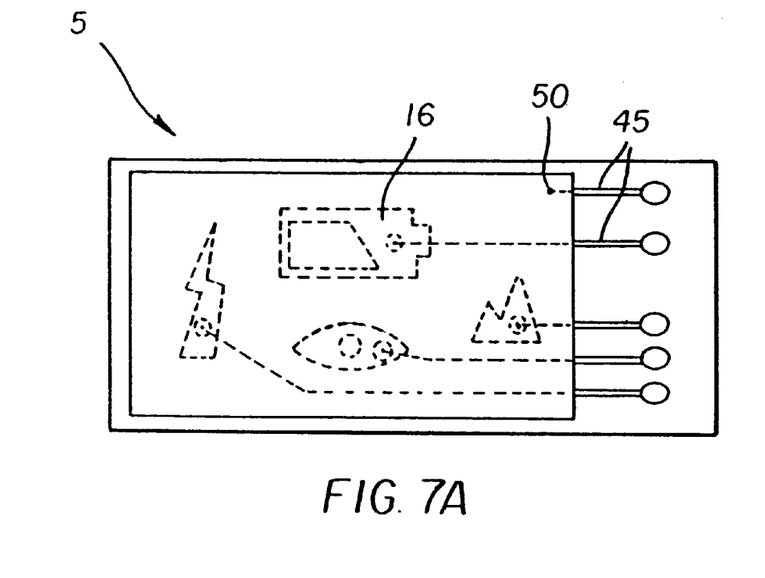
FIG. 7A is a top view of the completed display in an inactivated condition.
Figure 7B:
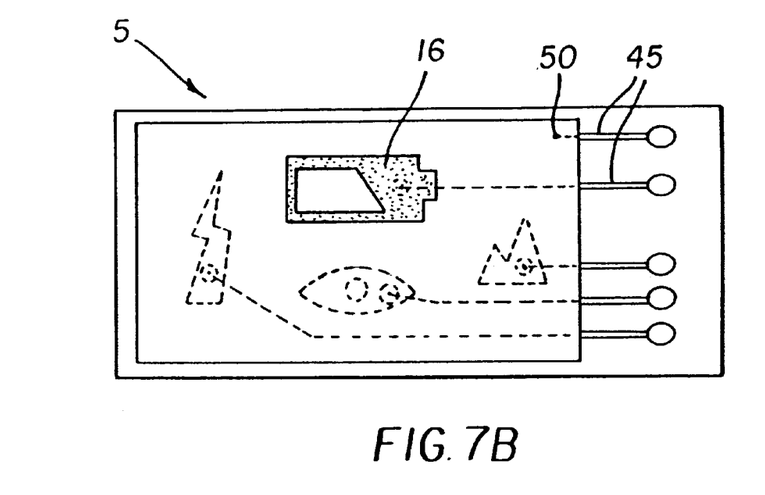
FIG. 7B is a top view of the completed display with an activated segment.

Top views of display 5 are shown in FIGS. 7A and 7B. Sheet 10 from FIG. 6B has been placed over circuit board 40 from FIG. 6A. Circuit board 40 has a series of circuit board traces 45 that provide interconnection the drive circuit in FIG. 5. FIG. 7A shows all opaque conductive areas 16 in light modulating layer 30 have been written into a reflective state. FIG. 7B shows a single opaque conductive area 16 has been grounded during the low voltage phase of display writing. Light modulating material 30 in that segment has become transparent, and the area over that opaque conductive areas 16 appears dark due to the light absorbing properties of opaque conductive area 16

Figure 8A:
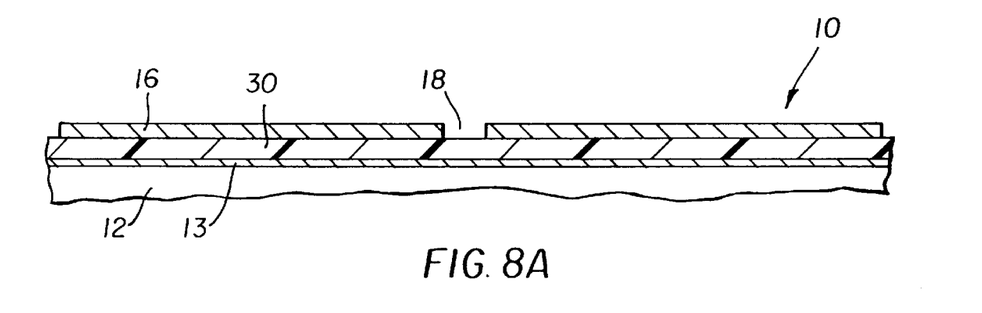
FIGS. 8A–8C are sectional views of the steps in processing a sheet in accordance with the present invention.
Figure 8B:
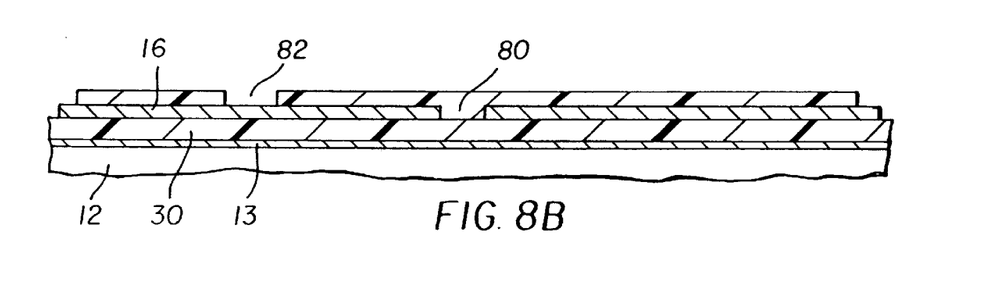
Figure 8C:
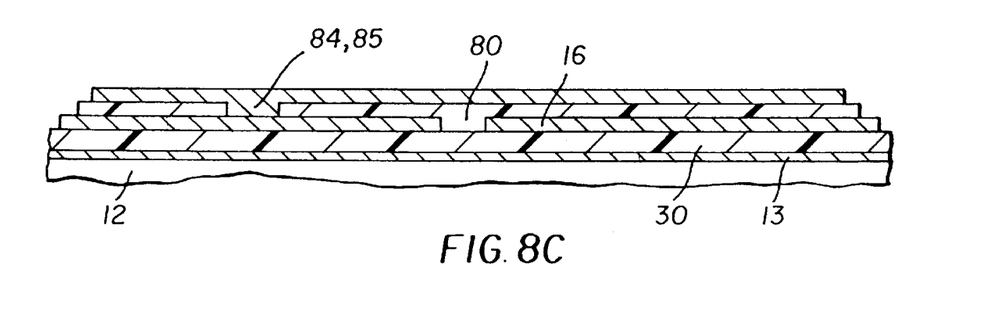
Figure 9A:
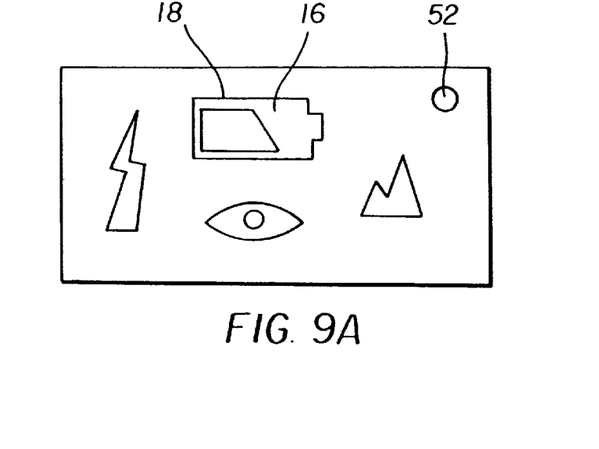
FIGS. 9A–9C are top views of the steps in processing a sheet in accordance with the present invention.
Figure 9B:
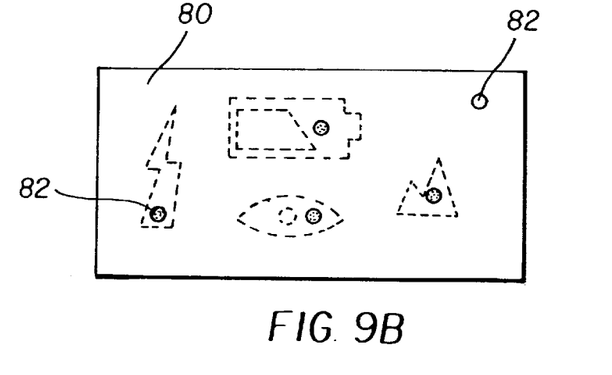
Figure 9C:
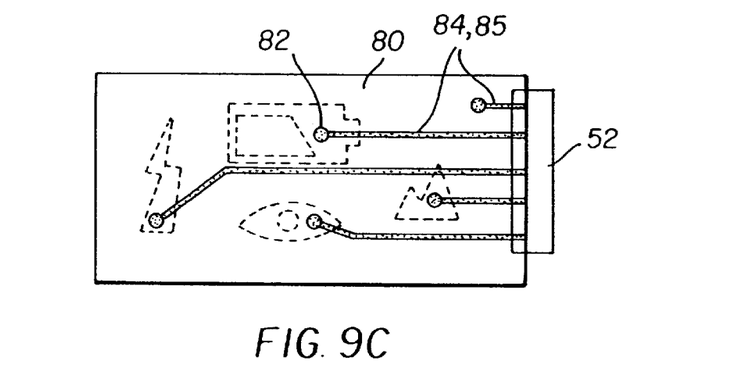

FIG. 8A through FIG. 8C are sectional views and FIGS. 9A through 9C are corresponding front views of steps for printing on a sheet 10 in accordance with the present invention. In this arrangement, the circuit board 40 is replaced with a multi layer conductive structure on sheet 10.

FIGS. 8A and 9A show the completed sheet 10 of FIG. 1B of the earlier embodiment, having opaque conductive areas 16 and non-conductive areas 18 to delineate opaque conductive areas 16 to isolate the opaque conductive areas 16 from adjacent opaque conductive areas 16. In FIGS. 8B and 9B, a non-conductive printed polymer, which is a dielectric, has been applied to sheet 10 to create an insulator 80 over opaque conductive areas 16 and non conductive areas 18. Openings or holes 82 are provided in insulator 80 over each opaque conductive area 16. In FIG. 8C and FIG. 9C a second conductive material 84 has been applied over insulator 80 create traces 45 that connect through the holes 82 to opaque conductive areas 16 and out to the edge of sheet 10 to power connection areas 52. The resulting sheet 10 does not need circuit board 40 and associated interconnect structures thereon.

The invention has been described in detail with particular reference to certain preferred embodiments thereof, but it will be understood that variations and modifications can be effected within the spirit and scope of the invention.

PARTS LIST 5 display
10 sheet
12 substrate
13 transparent, electrically conductive layer
14 patternable conductive layer
16 opaque conductive areas
18 non-conductive areas
20 planar liquid crystal
22 focal-conic liquid crystal
24 light absorber
26 domain
30 light modulating layer
40 circuit board
45 traces
47 contact pad
50 power pin
52 power connection area
55 incident light
60 reflected light
64 absorbed light
70 display drive
72 power supply
74 high/low power signal
80 insulator
82 Holes
84 Second conductive material
D1, D2, . . . , Dn Driver 1 through driver n

What is claimed is:

1. A method of forming a display in which images can be selectively presented to a viewer, comprising the steps of:
   (a) providing a transparent substrate;
   (b) forming a transparent, electrically conductive coating over the transparent substrate;
   (c) forming a light modulating layer including liquid crystal material in a polymer binder over the transparent, electrically conductive layer;
   (d) forming by directly depositing opaque conductive material in an image wise pattern over the light modulating layer by screen printing electrical conductive material in the form of viewable and conductive images, the light modulating layer being effective in a first condition to prevent the viewing of the viewable and conductive images and in a second condition to permit the viewing of the viewable and conductive images; and
   (e) providing electrical connections so that an electrical field can be applied across selected ones of such viewable and conductive images and the transparent, electrically conductive layer to cause the light modulating layer underlying the selected ones of the viewable and conductive images to change from the first condition to the second condition so as to present such viewable and conductive images for viewing to the viewer.

2. The method of claim 1 wherein the step of forming opaque conductive areas over the light modulating layer is by image wise forming opaque conductive ink images on the light modulating material.

3. The method of claim 1 wherein the light modulating material is a cholesteric liquid crystal and the opaque conductive material is substantially light absorbing to provide a black image.

4. A method of forming a display in which images can be selectively presented to a viewer, comprising the steps of:
   (a) providing a transparent substrate;
   (b) forming a transparent, electrically conductive coating over the transparent substrate;
   (c) forming a light modulating layer including liquid crystal material in a polymer binder over the transparent, electrically conductive layer;
   d) forming by directly depositing opaque conductive material in an image wise pattern over the light modulating layer by screen printing opaque electrical conductive material in the form of viewable and conductive images, the light modulating layer being effective in a first condition to prevent the viewing of the viewable and conductive images and in a second condition to permit the viewing of the viewable and conductive images;
   (e) forming an insulator over the first conductive areas with holes opening onto the first conductive areas; and
   (f) forming second conductive areas over the insulator to provide electrical traces which extend into the insulator holes and form electrical connection with the first conductive areas so that an electrical field can be applied across selected ones of such viewable and conductive images and the transparent, electrically conductive layer to cause the light modulating layer underlying the selected ones of the viewable and conductive images to change from the first condition to the second condition so as to present such viewable and conductive images for viewing to the viewer.

5. The method of claim 4 wherein the step of forming opaque conductive areas over the light modulating layer is by image wise forming opaque conductive ink images on the light modulating material.

6. The method of claim 4 wherein the light modulating material is a cholesteric liquid crystal and the opaque conductive material is substantially light absorbing to provide a black image.

* * * * *